(12) United States Patent
Kormann

(10) Patent No.: US 11,498,175 B2
(45) Date of Patent: Nov. 15, 2022

(54) CONTROL DEVICE AND CONTROL METHOD FOR CONTROLLING A MACHINE TOOL

(71) Applicant: GROB-WERKE GmbH & Co. KG, Mindelheim (DE)

(72) Inventor: Benjamin Kormann, Mindelheim (DE)

(73) Assignee: GROB-WERKE GmbH & Co. KG, Mindelheim (DE)

(*) Notice: Subject to any disclaimer, the term of this patent is extended or adjusted under 35 U.S.C. 154(b) by 652 days.

(21) Appl. No.: 16/487,619

(22) PCT Filed: Feb. 21, 2018

(86) PCT No.: PCT/DE2018/100149
§ 371 (c)(1),
(2) Date: Aug. 21, 2019

(87) PCT Pub. No.: WO2018/153408
PCT Pub. Date: Aug. 30, 2018

(65) Prior Publication Data
US 2019/0381622 A1     Dec. 19, 2019

(30) Foreign Application Priority Data
Feb. 22, 2017   (DE) ................. 10 2017 001 701.8

(51) Int. Cl.
*B23Q 15/22*     (2006.01)
*B23Q 15/013*    (2006.01)
(Continued)

(52) U.S. Cl.
CPC ......... *B23Q 15/225* (2013.01); *B23Q 15/013* (2013.01); *G05B 19/19* (2013.01); *G05B 19/409* (2013.01)

(58) Field of Classification Search
CPC .... B23Q 15/225; B23Q 15/013; G05B 19/19; G05B 19/409; G05B 2219/23283; G05B 19/416; G05B 19/425
See application file for complete search history.

(56) References Cited

U.S. PATENT DOCUMENTS 5,604,677 A   2/1997  Brien
6,243,857 B1  6/2001  Logan, III et al.
(Continued)

FOREIGN PATENT DOCUMENTS

CN   105629887 A   6/2016
DE   4291618 C2    5/1994
(Continued)

OTHER PUBLICATIONS

Chinese Office Action for corresponding Chinese Patent Application No. 2018800132153 dated Dec. 14, 2021 and English Translation.
(Continued)

*Primary Examiner* — Mohammad Ali
*Assistant Examiner* — Sheela Rao
(74) *Attorney, Agent, or Firm* — Greer, Burns & Crain, Ltd.

(57) ABSTRACT

A control device for controlling a machine tool, wherein the machine tool and the control device are configured such that a tool and/or workpiece disposed on the machine tool can be moved with at least one first speed and at least one second speed. When switching from a movement with the first speed to a movement with the second speed, the tool or the workpiece is at first stopped prior to the execution of the movement with the second speed, if the second speed is greater than the first speed by at least a predetermined factor. The control device has an input device for triggering the movement with the second speed, and the subsequent execution of the movement with the second speed is triggered by (Continued)

an operator input on the input device. A corresponding control method for controlling a machine tool is also described.

5 Claims, 2 Drawing Sheets

(51) Int. Cl.
  *G05B 19/19* (2006.01)
  *G05B 19/409* (2006.01)

(56) References Cited

U.S. PATENT DOCUMENTS

| | | | |
|---|---|---|---|
| 6,263,553 | B1 | 7/2001 | Muscarella et al. |
| 9,989,957 | B2 | 6/2018 | Kurosumi |
| 2007/0124904 | A1 | 6/2007 | Muscarella et al. |
| 2015/0133034 | A1* | 5/2015 | Luthi .................. B24B 41/005 451/178 |
| 2016/0082562 | A1* | 3/2016 | Besuchet ........... B23Q 17/2208 409/134 |
| 2016/0147212 | A1* | 5/2016 | Kurosumi ............. B23Q 15/08 700/160 |

FOREIGN PATENT DOCUMENTS

| | | |
|---|---|---|
| DE | 10314306 A1 | 10/2004 |
| DE | 102012106616 A1 | 1/2014 |

OTHER PUBLICATIONS

International Search Report; priority document.
German Search Report; priority document.

\* cited by examiner

CONTROL DEVICE AND CONTROL METHOD FOR CONTROLLING A MACHINE TOOL

CROSS-REFERENCES TO RELATED APPLICATIONS

This application claims the benefit of the International Application No. PCT/DE2018/100149, filed on Feb. 21, 2018, and of the German patent application No. 10 2017 001 701.8 filed on Feb. 22, 2017, the entire disclosures of which are incorporated herein by way of reference.

FIELD OF THE INVENTION

The invention relates to a control device for controlling a machine tool, wherein the machine tool and the control device are configured in such a way that a tool disposed on the machine tool and/or a workpiece disposed on the machine tool can be moved with at least one first speed and at least one second speed. The invention further relates to a control method for controlling a machine tool.

BACKGROUND OF THE INVENTION

During the run-in of a computer-controlled machine tool (CNC machine), a computer program (NC program), in which, inter alia, the machining steps to be carried out on a workpiece by the machine tool are specified, is executed step-by-step by an operator in order to check the program with respect to its correctness and executability for the desired machining operation. For example, incorrect machining steps can thus be recognized or collisions between the tool and the workpiece during a feed or positioning movement can be prevented.

For this purpose, the control systems of machine tools generally provide the possibility of having the NC program run in a single block mode. In this case, the program sequence is stopped after each individual program step, and the continuation of the program, i.e., the execution of the subsequent program step, is triggered by an operator input.

This is disadvantageous in that an operator input for executing the subsequent program step is required after each individual program step. Therefore, a considerable amount of operator inputs is required in order to test the entire NC program in all individual steps. This considerably increases the time required for a run-in.

However, the individual execution of all of the steps is often not necessary. A plurality of steps may also be executed in a contiguous manner, and only certain steps, e.g., fast rapid traversing or positioning movements, require stopping prior to the execution of the program and triggering the respective step by a separate operator input. Particularly critical situations are in this case such places in the program where the subsequent block, i.e., the movement in the subsequent program step, is considerably faster than the previous block. In such situations, it is hardly possible for the operator to react to an incorrect movement.

During the run-in of an NC program, the operator frequently wants to execute a series of feed movements, which are specified in successive program steps, in a contiguous manner without, however, being surprised by a subsequent high-speed rapid traversing movement. Rather, they wish to execute the subsequent rapid traversing movement in a controlled manner and, if possible, trigger it by a separate operator input, in order to prevent the tool from colliding with the workpiece at high speed, for example.

In order to make this possible, machine tool control systems are known whose operating elements include so-called override potentiometers. Often, two separate override potentiometers are provided in this case. The first override potentiometer, also referred to as a feed override potentiometer, in this case usually manipulates speeds of feed movements, i.e., of those movements with a generally lower speed that the tool, the workpiece, or both of them relative to one another, execute when the tool is machining the workpiece. By adjusting the first override potentiometer, the feed speed, which was specified in the NC program for the respective machining step upon execution of a program step, can be adapted and, in particular, reduced. The second override potentiometer (rapid traversing override potentiometer) manipulates rapid traversing speeds, i.e., of those movements with a generally—as compared with feed movements—higher speed that the tool, the workpiece, or both of them relative to one another, execute when the tool is being positioned relative to the workpiece. By adjusting the second override potentiometer, the rapid traversing or positioning speed, which is predetermined by the NC program when a positioning movement is executed, can be adapted, in particular reduced.

In order not to be surprised by a rapid traversing movement following a sequence of feed movements, but rather carry out the rapid traversing movement in a controlled manner and with a speed predetermined by the operator rather than the program, the operator first sets the rapid traversing potentiometer to 0%. If a sequence of program steps with feed movements is then followed by a program step with a rapid traversing movement, the machine tool, i.e., the tool and/or the workpiece, at first remains at a standstill until the operator deliberately turns up the rapid traversing potentiometer. In this way, the rapid traversing movement can be triggered in a controlled manner by the operator, and the execution speed can be manipulated by the operator. The rapid traverse movement does not start with the current setting of the feed override potentiometer, which at that moment is generally set to very high speeds, but can be started slowly and in a controlled manner with the separate rapid traverse override potentiometer.

On the one hand, one drawback in this case is that additional components in the form of override potentiometers, or at least a second override potentiometer, are required. A particular disadvantage is in this case, however, that the operator is required, after the execution of each individual rapid traversing movement, to reset the rapid traversing potentiometer to the 0% position during the subsequent feed movements, so that subsequent rapid traversing movements are again stopped at first and can then be executed in a controlled manner by the operator. If they forget, a later rapid traversing movement is automatically carried out by the program at the speed predetermined by it, so that the operator no longer has any control over this and is unable to avoid possible collisions between the tool and the workpiece.

SUMMARY OF THE INVENTION

It is therefore an object of the invention to provide a control device and a control method for controlling a machine tool with which the operator is able to trigger the execution of fast movements of the tool and/or the workpiece for each such movement, and wherein an automatic stop prior to the execution of fast movements is always ensured by the machine tool control system.

The object is accomplished by a control device for controlling a machine tool with the features of claim 1 and by a control method for controlling a machine tool with the method steps of claim 5. Advantageous embodiments of the invention are apparent from the dependent claims.

In a control device for controlling a machine tool according to the invention, the machine tool and the control device are configured in such a way that a tool disposed on the machine tool and/or a tool disposed on the machine tool can be moved with at least one first speed and at least one second speed. In this case, the control device is further configured in such a way that, when switching from a movement with the first speed to a movement with the second speed, the tool or the workpiece is at first stopped prior to the execution of the movement with the second speed if the second speed is greater than the first speed by at least a predetermined factor. The control device has an input device for triggering the movement with the second speed, and the subsequent execution of the movement with the second speed is triggered by an operator input on the input device.

If the speed of the second movement following the movement with the first speed is higher by at least a factor, i.e., if the second movement is faster by at least the predetermined factor than the first movement, then the execution of the program, i.e., the execution of the subsequent movement of the tool and/or the workpiece is stopped at first. The factor may have any value, in particular values greater than 1. Stopping may take place particularly if the speed of the movement with the second speed is higher by at least the factor 2 than the speed of the movement with the first speed. However, other factors may also be used, e.g., the factor 10 or any factors from the interval between 2 and 10. The factor may be inputted on the control device, e.g., by inputting by means of keys or a potentiometer, or also be firmly programmed into the control system and/or selectable by means of a selection menu or a touch screen.

In order to realize the invention, the program-related implementation does not necessarily have to take place in a program by providing a factor between the two speeds. The criterion of interrupting the program prior to executing the second movement may be implemented in a program also, for example, by the program being interrupted prior to executing the second movement if the second speed is greater by a (for example, additive) threshold value than the first speed. Effectively, there is also a factor provided in this case between the first and second speeds, so that the same effect is generated as in the actual implementation using a multiplicative factor, so that such an implementation also falls under the claimed scope of protection. This is also true if, as a criterion for interrupting the program, the second speed is merely compared with an absolute threshold value without including the first speed into the comparison in the process. Also in that case, a factor is effectively always provided between the two speeds nevertheless, and if the first speed is smaller than the threshold value, then the factor given by the quotient of the second speed at program interruption and the first speed is always greater than 1.

Using the input device provided on the control device according to the invention, the movement with the second speed, which is higher by at least the predetermined factor than the first speed, is then triggered by the operator. The program step of the NC program, by which the movement with the higher speed is specified, is triggered only by the triggering action.

A control device for controlling a machine tool configured in the sense of the invention is primarily characterized in that a movement with a higher speed, i.e., a faster movement, can be stopped automatically each time if it follows a previous movement with a lower speed, i.e. a slower movement, without any special interventions by the operator being required for this purpose. It is thus ensured that the machine tool or the NC program first stops automatically each time prior to executing a fast movement, so that an inadvertent execution of a fast movement, and collisions possibly caused thereby, can be reliably prevented. The subsequent execution of the movement in this case always requires confirmation by the operator. No second potentiometer is required for this; rather, one of the keys provided on the operating means of the machine tool control system is sufficient for this purpose. As a result, the movements can be controlled with a single operating element without the attention of the operator being diverted by "blindly" searching for the operating elements (during a run-in, operators mainly direct their attention to the workpiece and the tool as such, and not to the operating elements of the control system, which they operate blindly for the most part).

In this case, it is particularly advantageous that in the control device for controlling a machine tool configured in the sense of the invention it is possible to specify or set, by means of the predefinable factor, for which speed differences between a first, slower movement and a subsequent second, faster movement the execution of the program, and thus the execution of the second movement, can be stopped first and then continued by an operator input.

In the control device according to the invention, the function according to the invention can be configured to be deactivatable, so that the operator is able to choose whether they wish to use the function or whether they wish to use the conventional single block function described in the introduction.

In an advantageous embodiment of the control device according to the invention, the input device is a release key, a release toggle switch, a rotary release switch or a potentiometer with a pull or push function. After stopping the program prior to the beginning of the movement with the second, higher speed, the operator can trigger the second movement by means of an input on the input device. A key permits a simple input on an operating element which is usually already provided on a machine tool control system, i.e., an already existing key may be reprogrammed accordingly. In contrast, the position of the input element can be monitored by toggle or rotary switches.

In another advantageous embodiment of the control device according to the invention, the control device has a further input device for manipulating the speed of the movement with the second speed. Due to the further input device, it is possible to manipulate the speed of the second movement and, deviating from the speed specified in the NC program, to execute the second faster movement with a lower speed, for example, than is predefined in the program, so that in the process, collisions between the tool and the workpiece can be recognized in due time, for example. The speed of the movement with the second speed can be manipulated, for example, by means of a potentiometer or also by an input on a keyboard, a touch screen or corresponding menu items of the control device of the machine tool.

While it is basically not absolutely necessary in the invention to be able to manually manipulate the speed of the second movement, e.g., of a rapid traversing movement, by the operator, it is nevertheless advantageous if that is possible. Though a separate rapid traverse override potentiometer is omitted in the present invention, the control system of the machine tool, however, will generally continue to include at least one override potentiometer, e.g., a feed override potentiometer. In that case, the latter may be used in the above-described advantageous embodiment of the invention to also manipulate the speed of the second faster movement, e.g., of a rapid traversing movement. In that case, the interruption of the program when switching from a first slower movement to a second faster movement may be used to turn the override potentiometer to 0 prior to starting the next movement. After starting the next movement, the override potentiometer (or even an arbitrary, different speed-manipulating operating element, e.g., slow-fast-keys) may then be turned up slowly in order to be able to control the speed of the movement.

In another advantageous embodiment of the control device according to the invention, the movement with the first speed is a feed movement, and the movement with the second speed is a rapid traversing movement. A fast positioning movement, during which a tool is not in engagement with a workpiece, is usually referred to as a rapid traverse. In contrast, the movement during the machining of the workpiece by the tool is usually referred to as feed. The rapid traversing movement is usually much faster than the feed movement. Whereas errors in a feed movement can generally be recognized by the operator in due time due to the slow speed, the reaction to an erroneous rapid traversing movement, e.g., the recognition of collisions, is generally not possible. Therefore, it is necessary for the operator to first stop prior to a rapid traversing movement, turn the override potentiometer, if provided, to 0, to check the position, in particular the distance, of the tool and the workpiece relative to one another, then to refer to the program as to which path is to be traveled in the subsequent rapid traversing movement, then to assess whether that path can be traveled without any collision, and only then to trigger the rapid traversing movement. This is made possible by the control device according to the invention.

In the control method for controlling a machine tool according to the invention, a program sequence is first started by an operator, wherein the program sequence includes a sequence of movements of a tool and/or workpiece with different speeds.

When switching from a movement with a first speed to a subsequent movement with a second speed, the program sequence is then stopped by a control device of the machine tool prior to the movement with the second speed being executed, if the second speed is greater than the first speed by at least a predetermined factor.

The execution of the second movement is then triggered by an operator input on an input device provided on the control device of the machine tool.

In the movement with the second speed, the speed is thus faster by at least a predetermined factor than in the movement with the first speed, when the program is stopped prior to the start of the movement with the second speed. The movement with the second speed may be a rapid traverse, for example, and the movement with the second speed may be a feed movement. The factor by which the speeds differ may preferably be in the range between 2 and 10.

In an advantageous embodiment of the control method according to the invention, the speed of the movement with the second speed is predetermined by a further operator input. This may take place, for example, by predetermining the speed by means of a potentiometer or by means of an input via a keyboard. As a result, it is possible to not only trigger the movement with the higher speed in a targeted manner, but also to manipulate the speed in such a way that a monitoring and recognition of possible collisions by the operator is possible while executing the movement, and that the operation can then be aborted in due time.

BRIEF DESCRIPTION OF THE DRAWINGS

An exemplary embodiment of the invention will be described below with reference to the attached drawings.

In the Figures.

DETAILED DESCRIPTION OF THE PREFERRED EMBODIMENTS

Figure 1:
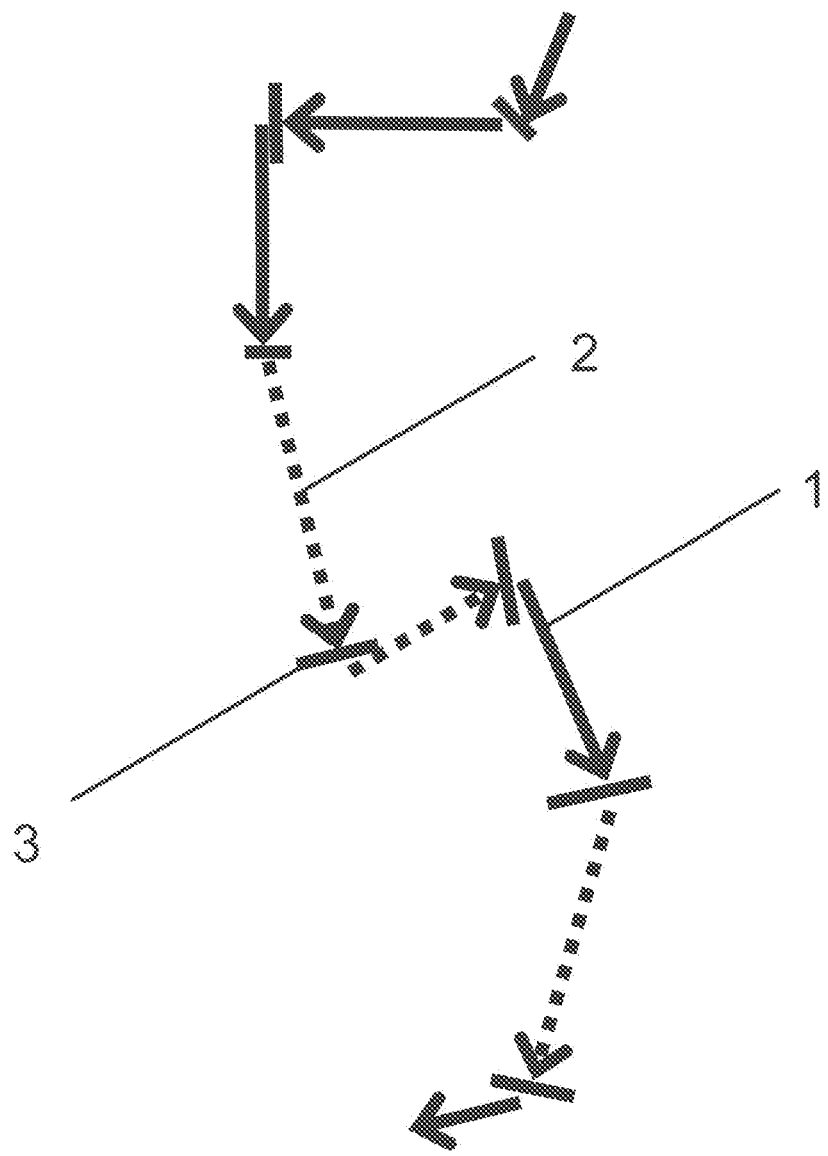
FIG. 1 shows a sequence of feed and rapid traversing movement and the respective interruptions of movement in a sequence according to the prior art.
Figure 2:
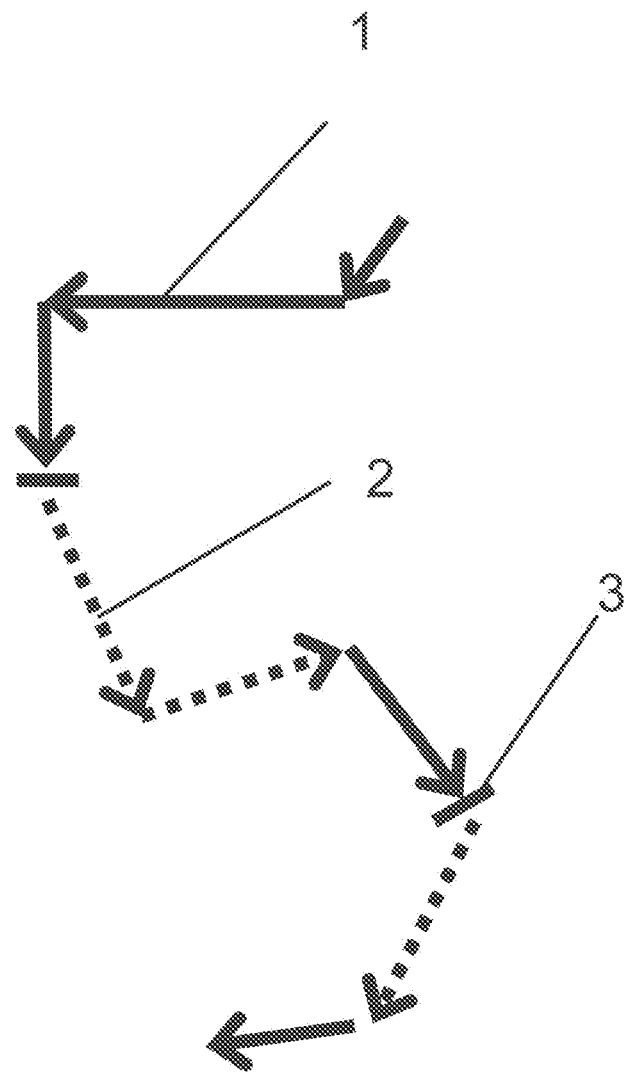
FIG. 2 shows a sequence of feed and rapid traversing movement with interruptions of movement in a sequence controlled by the control device according to the invention.

FIG. 1 shows a sequence of feed and rapid traversing movement and the respective interruptions of movement in a sequence of successive movements according to the prior art. After the execution of a program section or program block of the NC program, in which a slow movement 1 that is illustrated with continuous arrows in FIGS. 1 and 2, e.g., a feed movement, is predetermined, a program interruption or an interruption of movement 3 is always carried out at first. Before the subsequent movement is initiated, be it a slow feed movement 1 or a fast rapid traversing movement 2, which is illustrated in FIGS. 1 and 2 with dashed arrows, the program sequence and thus the sequence of movements is first stopped by means of a program interruption or an interruption of movement 3. Thus, the subsequent movement must always be triggered by an operator input, e.g., by a key input.

Thus, the program and the movement are stopped after each individual movement step 1, 2 without the operator having the option of also executing, in a contiguous manner without any intermediate interruptions, successive slow movements, e.g., directly successive feed movements, because they often do not require an interruption of movement 3, but the operator can observe, during the execution of the movements, whether problems may arise, and can stop the movement in due time in case of error due to the mostly slower speeds of movement.

In the sequence of feed and rapid traversing movements 1, 2 with interruptions of movement or program interruptions 3 in a sequence controlled by the control device according to the invention, which is shown in FIG. 2, an interruption 3 of the sequence of movements in contrast only takes place if a slow movement 1, e.g., a feed movement, is directly followed by a fast movement 2, e.g., a rapid traversing movement. Only in the case of speed difference between successive movements in which the speed of the subsequent movement is greater by a predetermined factor than the speed of the previous movement, is the movement interrupted until the subsequent movement is triggered by an intervention by the operator, e.g., by a key input. It is thus possible to execute several program steps, in which movements with low speeds 1 are carried out, in a contiguous manner without any interruptions, and to interrupt the program sequence only prior to program steps in which movements with higher speeds 2 are executed, in order thus to provide the operator with a control option for them and permit a subsequent separate initialization of the movement. If, however, a movement with high speed is followed by a movement with low speed, then no program interruption is executed, and the movement with low speed 1 takes place, without any interruption, directly subsequent to the movement with high speed 2.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

1 Slow movement, e.g., feed movement
2 Fast movement, e.g., rapid traversing movement
3 Program interruption or interruption of movement

The invention claimed is:

1. A control device for controlling a machine tool,
wherein the machine tool and the control device are configured such that at least one of a tool or workpiece disposed on the machine tool is movable with at least one first speed and at least one second speed,
the control device being further configured such that, when switching from a movement with the first speed to a movement with the second speed, when the second speed is greater than the first speed by at least a predetermined factor, the at least one of the tool or the workpiece is at first stopped prior to the execution of the movement with the second speed, and, when the second speed is less than the first speed or when the second speed is greater than the first speed by less than the predetermined factor, the at least one of the tool or the workpiece is not stopped prior to the execution of the movement with the second speed,
the control device having an input device for triggering the movement with the second speed, and
the control device being further configured to require that a subsequent execution of the movement with the second speed must be triggered by an operator input on the input device.

2. The control device according to claim 1, wherein the input device comprises a release key, a release toggle switch, a rotary release switch or a potentiometer with a pull or push function.

3. The control device according to claim 1, wherein the movement with the first speed is a feed movement, and the movement with the second speed is a rapid traversing movement.

4. A control method for controlling a machine tool, comprising the steps:
starting a program sequence by an operator, wherein the program sequence includes a sequence of movements of at least one of a tool or workpiece with different speeds, and,
when switching from a movement with a first speed to a subsequent movement with a second speed, either
stopping the program sequence by a control device of the machine tool prior to the movement with the second speed being executed, when the second speed is greater than the first speed by at least a predetermined factor, and
triggering the execution of the second movement by an operator input on an input device provided on the control device of the machine tool; or
maintaining the program sequence by the control device of the machine tool when the second speed is less than the first speed or when the second speed is greater than the first speed by less than the predetermined factor.

5. The control method according to claim 4, wherein the speed of the movement with the second speed is predetermined.

* * * * *